March 11, 1930. R. T. ROMINE 1,750,130
HANDLING AND ASSEMBLING AUTOMOBILE BODIES
Filed Oct. 27, 1926 3 Sheets-Sheet 3
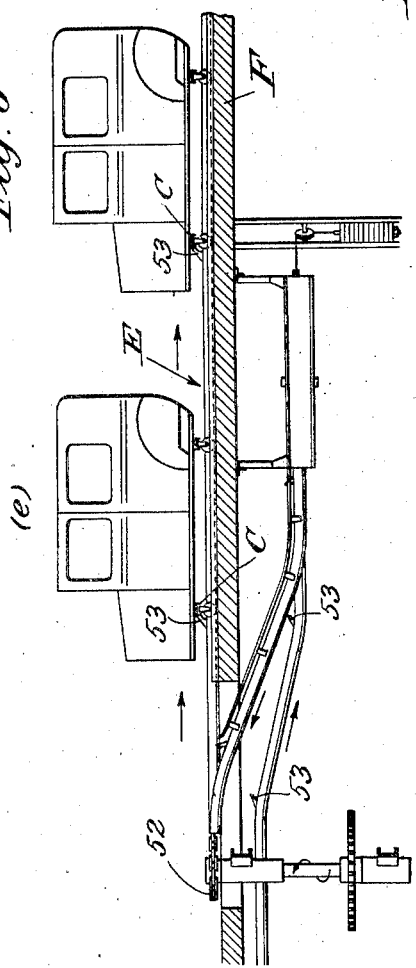
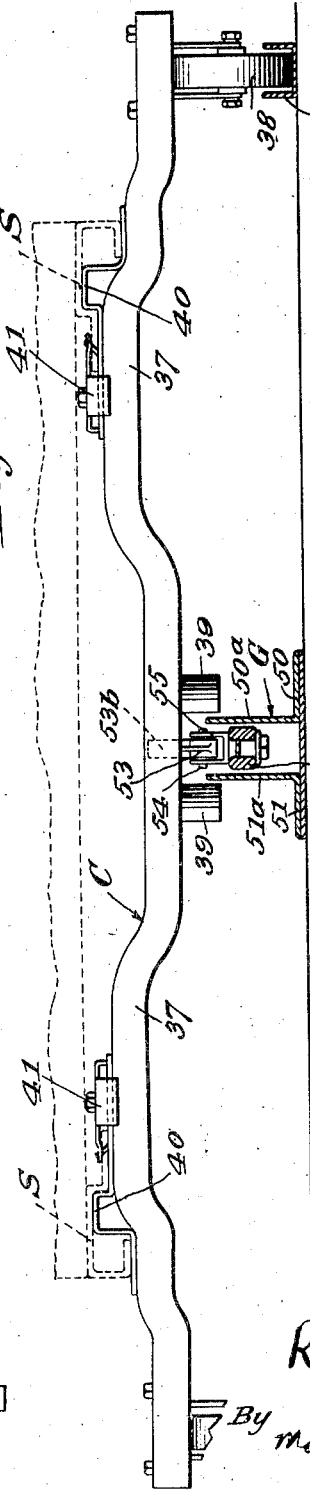
Inventor:
Robert T. Romine
By Macleod, Calver, Copeland & Dike
Attorneys.

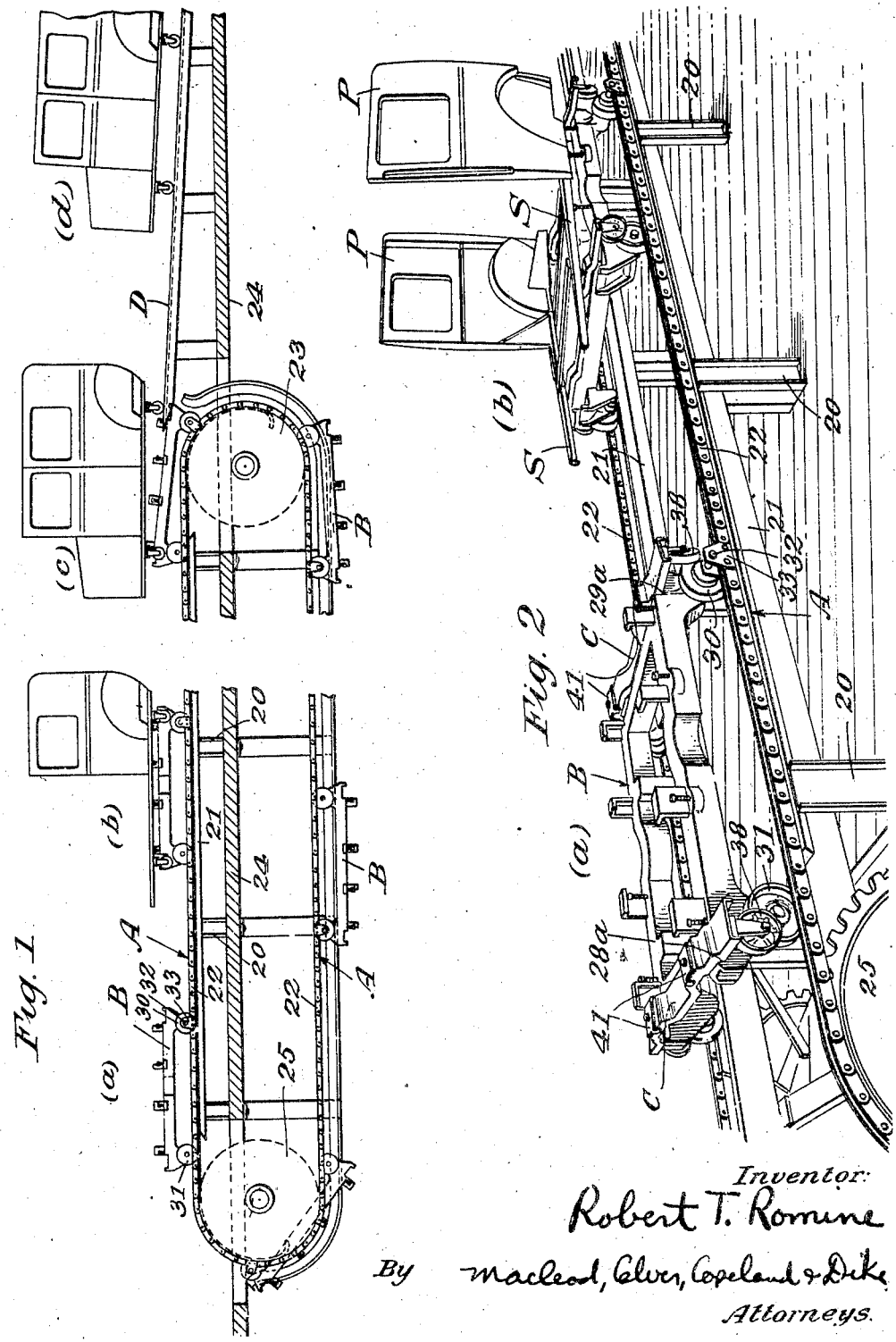

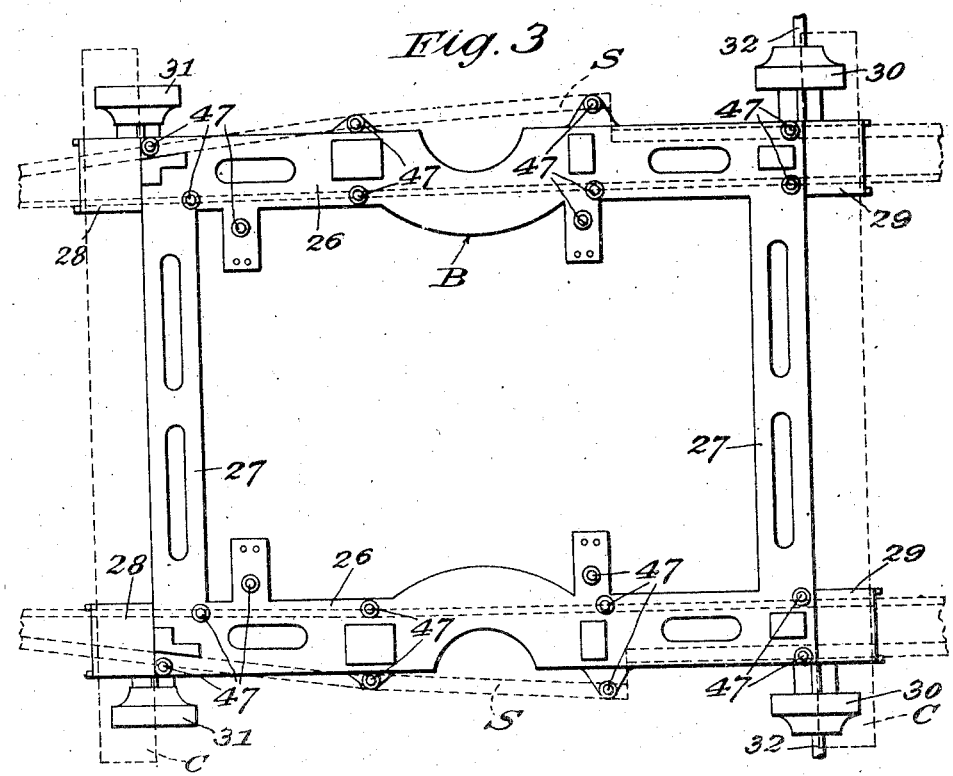
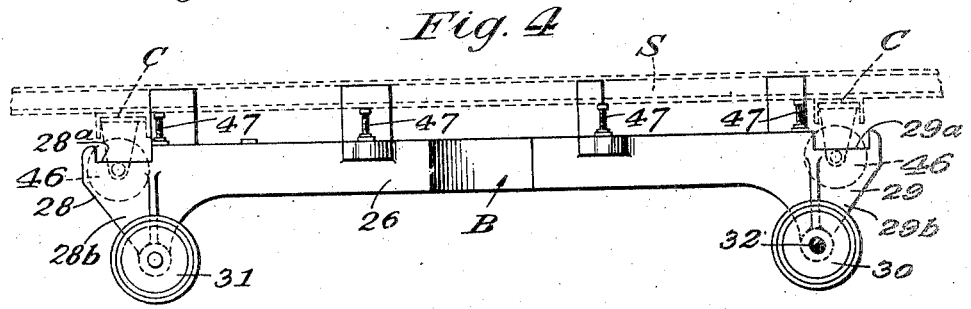
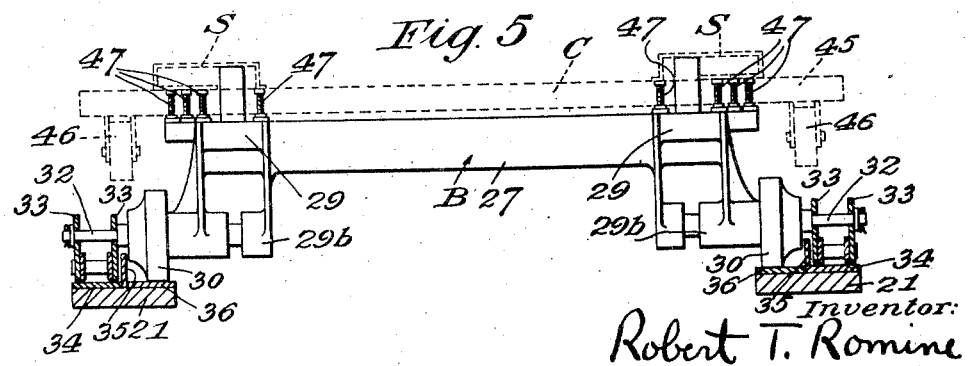

Patented Mar. 11, 1930

1,750,130

UNITED STATES PATENT OFFICE

ROBERT T. ROMINE, OF MOUNT CLEMENS, MICHIGAN, ASSIGNOR TO HUDSON MOTOR CAR COMPANY, OF DETROIT, MICHIGAN, A CORPORATION OF MICHIGAN

HANDLING AND ASSEMBLING AUTOMOBILE BODIES

Application filed October 27, 1926. Serial No. 144,494.

This invention relates to a new and improved method of handling, moving and assembling automobile bodies during production, one of the important objects being to facilitate the movement of bodies during the process of their construction, to eliminate a large amount of manual handling and lifting of the bodies at different stages of production, to enable the movement of bodies to be speeded up and the complete assembly of the bodies to be accomplished more readily and economically.

As a result of the invention, at plants where mass production is carried on, less floor space and overhead room is required, less congestion results, and considerable reduction in labor costs and other manufacturing costs is obtained.

Other objects of the invention will appear in the following description and appended claims reference being had to the accompanying drawings illustrative of the invention wherein like reference characters designate corresponding parts in the several views.

Fig. 1 is a diagrammatic side elevation showing the floor of the plant in section and illustrating the frame assembling line for the bodies according to the invention.

Fig. 2 is a perspective view of an endless conveyor and illustrating several steps in the method.

Fig. 3 is a plan view of one of the conveyor bucks.

Fig. 4 is a side elevation thereof.

Fig. 5 is a transverse vertical section through the conveyor.

Fig. 6 is a diagrammatic side elevation showing the floor of the plant in section and illustrating the trim assembly line for the bodies according to the invention.

Fig. 7 is a fragmentary view partly in section showing the manner in which the paint sticks or caster bars are guided and moved on the trim assembly line.

Fig. 8 is a detail view illustrating one of the conveyor pusher dogs for cooperating with the caster bar or paint stick.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

The present application is a continuation in part of my copending applications Serial No. 133,375, filed September 3, 1926, and Serial No. 133,372, filed September 3, 1926.

My invention is particularly adapted for use where mass production of automobile bodies is carried on, and where bodies are assembled successively by a progressive system on assembly lines usually embodying moving or traveling conveyors. The invention, under certain systems of production, after the assembly of the body frame enables the bodies to be more readily and quickly moved to and from the bake ovens in cases where the enamelling, painting or duco finish operations are performed after the frame assembly. It enables the bodies to be more easily and quickly moved from the frame assembly lines to the trim lines, and facilitates the trimming of the bodies. It enables more rapid and economical movement of the bodies to and from storage rooms, or from one plant to another, or for transportation in freight cars or trailers from one plant to another.

In the preferred form of the invention, I assemble with the sills of the body frame, preferably at the initial step of the frame assembly on a traveling conveyor, relatively small caster wheels. This is best accomplished by means of paint sticks or bars each carrying a pair of swiveled caster wheels, such as shown in Fig. 7. In the preferred apparatus illustrative of the method, a pair of such paint sticks or bars, herein termed for convenience caster bars or members, may first be placed on the "buck" or fixture of the moving conveyor transversely thereto. The longitudinal bottom sills of the body are detachably mounted on these caster bars, or the sills may first be placed in position and the caster bars then detachably connected to the bottom of the sills adjacent opposite ends thereof. Thereafter, as the conveyor travels along the assembly line the body frame is assembled. At the end of the frame assembly the body moves off the conveyor onto the casters and thereafter each body may be moved throughout the remainder of its process of manufacture on the casters. Thus the bodies may be successively rolled on the casters to the trim assembly lines where the upholstering is applied as well as the usual body fittings and accessories. The bodies may be moved and guided successively in a predetermined path along the trim assembly line while traveling on the casters. This eliminates the cost of elaborate endless conveyors, and enables the bodies to be supported close to the floor and at the height of the workmen, facilitating and greatly simplifying the trimming of the interiors of the bodies.

In Figs. 1 and 2 I have illustrated by way of example a part of an assembly line along which the bodies may be progressively assembled, and herein termed for convenience the frame assembly line. A suitable endless conveyor A is shown, comprising two longitudinal series of supports 20 carrying spaced parallel supporting track or ways 21 for endless conveyor chains 22. At the forward end of their upper run the chains travel over suitable sprockets 23 which may be positioned as shown so as to depress or carry the conveyor downwardly through an opening in the floor 24. Thence the conveyor on its return run travels beneath the floor to the sprockets 25 at the initial end of the assembly line. Connected to the chains 22 are a spaced series of trucks or body platforms B, herein termed conveyor "bucks." Referring to Figs. 3 to 5 inclusive, each buck B comprises a skeleton frame made up of side members 26 and transverse end members 27. The members 26 have a pair of rear extensions 28 and a pair of front extensions 29, each recessed at 28ª and 29ª respectively to provide seats for paint sticks or caster bars. The extensions or bosses 28 extend downwardly below the frame 26—27 to provide bearings for front and rear pairs of rollers or casters 30 and 31 respectively.

The conveyor buck is pivotally connected at its forward end to the chains 22 through the medium of the forward pair of rollers 30. The spindles 32 for these rollers are extended freely through alined holes in a pair of upstanding plates or brackets 33 riveted to opposite sides of certain of the chain links.

Referring to Fig. 5 the horizontal ways 21 carry longitudinal guide angles 34, the horizontal flanges of which form the supporting surfaces for the moving chains and the vertical flanges 35 forming guides cooperating with the hubs of rollers 30 and 31 for maintaining the bucks in proper position against lateral displacement. The chains also are guided by these guide flanges 35, and wear strips 36 may be mounted on the sills 21 for the rollers.

The frames of the bodies are assembled on the successive bucks or platforms B. These travel on their rollers or casters and are guided on the tracks or ways 21, being propelled by means of chains 22 connected to the forward pair of the rollers.

In accordance with the invention I preferably assemble caster bars or paint sticks C to the body sills at the beginning of the frame assembly line. Referring to Figs. 7 and 8 one type of caster bar C is shown, comprising a channel bar 37 which may be shaped as shown in Fig. 7 and carries at each end a suitable caster wheel 38, the upper swivelled structure 38ª of which, as shown in Fig. 8, is housed within the depending flanges of the inverted channel 37. This bar 37 carries centrally thereof a pair of spaced depending guides 39. Adjacent opposite ends of the channel bar 37 and at the top thereof are a pair of adjustable clamps, each comprising a fixed part 40 and a movable part 41, shaped and adapted to cooperate with the body sill and to releasably clamp the body sill to the paint stick. A further detailed description of the caster bar C is not deemed necessary herein as the same is fully shown and described in my above co-pending application Serial No. 133,372 of which the present application is in part a continuation.

Referring to Figs. 1 and 2, at the beginning of the assembly line, at position (a), a pair of caster bars C may be placed transversely of the conveyor buck B at opposite ends thereof. These caster bars may be placed on the seats formed by recesses 28ª and 29ª as shown in Fig. 2. It will be noted that the caster wheels 38 will be suspended above the position of the rollers 30 and 31 for a purpose later explained. In the next step of the assembly the spaced longitudinal sills S of the body may be placed on the front and rear caster bars and clamped thereto by means of the clamping members 40 and 41. Thereafter the body panels or upper frame parts may be progressively assembled on the sills S as the conveyor buck moves along the assembly line.

In the position shown at (b) Figs. 1 and 2 a pair of body panels P have been assembled on the sills S, and as conveyor travels forwardly the remaining frame parts are assembled until the body reaches the end of the frame assembly line, such as shown at (c) Fig. 1. At this point the conveyor is depressed and the body moves off the conveyor. In the present instance spaced inclined runways D are provided, the free end of which lying in such position whereby the front caster wheels will travel thereon, lifting the front of the body off the conveyor buck as the front end of the latter travels downwardly as shown at position c. Since the caster wheels lie outside the rollers 30 and 31 of the buck and above the conveyor chains, the free end of the runways D may project between the caster wheels and the conveyor chains and permit the body to roll off the conveyor onto the runways. In like manner the rear paint stick caster wheels will move onto the runways D and thence the body will travel down the runways to the floor of the plant as shown at position (d).

The body sills S may be first mounted in position on the conveyor buck B and the paint sticks or caster bars C then attached to the bottom of the sills. As shown in Figs. 4 and 5 a type of caster bar may be used comprising a straight inverted channel 45 having casters 46 at opposite ends. The sills S are supported on sets of adjusting screws 47 which are adjusted to level the sills, and the caster bars are detachably connected to the bottom of the sills and suspended therefrom.

After the bodies pass from the frame assembly line they may be conveyed to the trim line. This may be in the same plant or elsewhere. The bodies are moved on the floor on their own casters, and may be conveyed from one plant to another in trailers or freight cars without removing the casters, which method facilitates handling since at no point is it necessary as heretofore to manually lift or drag the bodies around. In my copending application, Serial No. 133,375, filed September 3, 1926, I have shown apparatus and methods for conveying the bodies from the frame assembly line, or from storage places after the body frames are assembled, to the trim line where the latter is located in a different plant from that in which the frame assembly line is located.

The bodies are transported on their caster bars C from the frame assembly line a, Figs. 1 and 2, to the trim assembly line e where the upholstery is put on as well as other trimmings and accessories. At the trim line the bodies move in succession at the proper spaced intervals in a predetermined path with the caster wheels traveling on the floor F of the plant. In this way the bottom of the body travels within a few inches from the floor, so that the entire body is within the height of the workmen, permitting the top or roof and upholstery and other parts to be easily put on. This is a great advantage in facilitating and speeding up the trim work.

In the present instance a central guide G extends along the floor the length of the trim assembly line. This guide comprises spaced angles 50 and 51 with the vertical flanges $50^a$ and $51^a$ positioned back to back but in spaced relation to permit the endless conveyor chain 52 to travel therethrough. This chain at predetermined spaced intervals carries a series of pivoted pusher dogs 53. Each dog is pivoted on a pin 54 carried by a bifurcated member 55 secured to one of the chain links. The dog has a rearwardly extending shank $53^a$ engaging a portion of the chain link so as to permit the dog to swing only in a forward direction. The forward portion $53^b$ of the dog is adapted to engage the rear side of the paint stick C, so that as the chain travels in the direction of the arrows in Fig. 6 within the guide G the bodies will be moved in succession along the trim line at the proper intervals. The pivoting of the dogs 53 to swing forwardly enables the bodies to be rolled in a forward direction over the conveyor chain, and the dogs will be depressed when the paint stick bars engage them.

As shown in Fig. 6 each body is rolled into position to cause the caster wheels 38 of the pair of caster bars supporting the body to straddle the guide G. Spaced guide channels 55 may be placed on the floor within which the caster wheels 38 will travel. With the body moved to the position shown at (e) in Fig. 6, one of the dogs 53 will engage one of the caster bars and thereupon the body will be moved at the proper speed along the assembly line. At the end of the trim assembly line, at point (f) in Fig. 6, the conveyor chain 52 may be depressed so as to pass downwardly through the opening H in the floor, and the body may be rolled on the floor of the plant away from the assembly line, either to a storage place or to the point where the body is assembled on the chassis of the car.

What I claim is:

1. The hereindescribed method of handling and assembling automobile bodies, consisting in progressively assembling the frame members of the bodies along an assembly line, detachably connecting caster bars to the bottom of the bodies at predetermined points along the assembly line, moving the bodies from the assembly line to a trim assembly line on their casters, and progressively trimming the bodies during their movement on the casters along the trim assembly line.

2. The hereindescribed method of handling and assembling automobile bodies, consisting in progressively assembling the frame members of the bodies along an assembly line, detachably connecting caster bars to the bottoms of the bodies at predetermined points along the assembly line, moving the bodies from the assembly line to a trim assembly line on their casters, and successively moving the bodies on their casters along the trim assembly line by means of a moving conveyor cooperating with the caster bars for moving the same.

3. The hereindescribed method of handling and assembling automobile bodies, consisting in progressively assembling the frame members of the bodies along a moving conveyor line, detachably assembling swivelled casters to the bottom of each body at a predetermined point along the conveyor line, moving the bodies successively from the conveyor line on the casters, thereafter moving the bodies successively along a trim assembly line on said casters, and guiding the movement of the bodies along a predetermined path.

4. The hereindescribed method of assembling bodies on a moving conveyor, consisting in supporting a pair of caster bars on the conveyor, assembling the frame parts of the body on said caster bars, and moving the body off the conveyor with the body carried on said caster bars.

5. The hereindescribed method of handling and assembling automobile bodies, consisting in progressively assembling with the body sills the frame parts of the body and caster wheel members along a moving conveyor line, and at the end of the line moving the body off the conveyor line with the body supported for movement on the caster wheels.

6. The hereindescribed method of handling and assembling automobile bodies, consisting in progressively assembling with the body sills the frame parts of the body and caster wheel members along a moving conveyor line, and at the end of the line moving the body off the conveyor line with the body supported for movement on the caster wheels, and trimming the body while moving it in a predetermined path on said caster wheels.

7. The hereindescribed method of assembling automobile bodies, consisting in placing the body sills on a moving conveyor, detachably connecting members carrying casters to the bottom of the sills and assembling the body panels on top of the sills, and moving the body off the conveyor with the body supported for movement on said casters.

8. The hereindescribed method of assembling automobile bodies, consisting in placing the body sills on a moving conveyor, detachably connecting members carrying casters to the bottom of the sills and assembling the body panels on top of the sills, moving the body off the conveyor with the body supported for movement on said casters, and trimming the body while moving it in a predetermined path on said casters.

9. The hereindescribed method of assembling automobile bodies, consisting in placing the body sills on a moving conveyor, detachably connecting members carrying casters to the bottom of the sills and assembling the body panels on top of the sills, moving the body off the conveyor with the body supported for movement on said casters, moving the body on said casters to a second conveyor line, and trimming the body while moving it in a predetermined path on said casters.

10. The hereindescribed method of assembling automobile bodies, consisting in detachably connecting members carrying casters to the bottom of the body while assembling the body on a moving conveyor, depressing the conveyor at a predetermined point to permit the assembled body to roll off the conveyor on the casters.

11. The hereindescribed method, consisting in successively placing pairs of bars carrying casters on successive moving conveyor bucks, detachably mounting the body sills of a car on each pair of bars, progressively assembling bodies on the successive bucks, and successively moving the bodies away from the conveyor bucks on the casters.

12. The hereindescribed method of assembling bodies, consisting in detachably connecting swivelled caster wheels to the bottom of the body during the assembly of the body frame on the moving conveyor, moving the body at a predetermined point off the conveyor with the body supported for movement on said caster wheels, moving the body to a second conveyor, and trimming the body while it is moved on its caster wheels by the second conveyor in a predetermined path.

13. In a body handling and assembling apparatus, the combination of a conveyor, body assembling bucks attached to said conveyor, a pair of caster carrying bars, means at opposite ends of each buck for seating said bars against displacement, and means carried by said buck and bars for supporting the body sills in predetermined position to permit the body to be assembled.

14. In a body handling and assembling apparatus, the combination of a conveyor, body assembling bucks attached to said conveyor, a pair of channel bars carrying casters at opposite ends, and means carried by each buck for seating said bars and including abutments confining opposite faces of said channel bars.

15. The hereindescribed method of assembling automobile bodies, consisting in progressively assembling frame parts of the body along an assembly line, moving the body while supported on caster wheels in relatively close proximity to the floor to a trim line, and progressively trimming the body while moving it on the caster wheels.

16. The hereindescribed method of assembling automobile bodies, consisting in detachably supporting each of a series of bodies on caster wheels, moving said bodies in succession along an assembly line in close proximity to the floor, and progressively trimming the bodies while supported for movement on their caster wheels.

In testimony whereof I affix my signature.

ROBERT T. ROMINE.